United States Patent [19]
Navratil et al.

[11] Patent Number: 5,967,492
[45] Date of Patent: Oct. 19, 1999

[54] SEALING DEVICE FOR DIAPHRAGM VALVES

[75] Inventors: Pierre Navratil; Alain Gotas, both of Montpellier, France

[73] Assignee: Societe Qualiflow SA, Montpellier Cedex, France

[21] Appl. No.: 09/024,645

[22] Filed: Feb. 17, 1998

[30] Foreign Application Priority Data

Feb. 17, 1997 [FR] France .................................. 97 01933

[51] Int. Cl.$^6$ ........................................................ F16K 7/16
[52] U.S. Cl. ............................................ 251/331; 251/368
[58] Field of Search .................................. 251/331, 368, 251/359

[56] References Cited

U.S. PATENT DOCUMENTS

| | | | |
|---|---|---|---|
| 5,201,492 | 4/1993 | Beauvir | 251/331 |
| 5,326,078 | 7/1994 | Kimura | 251/331 |
| 5,524,865 | 6/1996 | Uchisawa et al. | 251/331 |

*Primary Examiner*—Kevin Lee
*Attorney, Agent, or Firm*—Harrison & Egbert

[57] ABSTRACT

A fluid circuit sealing apparatus having a valve body with a valve base having a fluid inlet pipe and a fluid discharge pipe extending therethrough, a diaphragm having a cup shape, and a piston engageable with the diaphragm so as to deform the diaphragm so as to rest upon a seat provided on a rim of the inlet pipe. The diaphragm is clamped on an edge thereof between the valve body and the clamping cover. The diaphragm has a raised circumferential rim which forms an angle with a bottom of the diaphragm. The diaphragm has a parabolic dome. The raised circumferential rim has a circular upward fold portion extending to a slanting annular portion. The slanting annular portion is connected to the parabolic dome by a circular fold. The circular fold extends around a periphery of the parabolic dome.

10 Claims, 3 Drawing Sheets

FIG. 5A
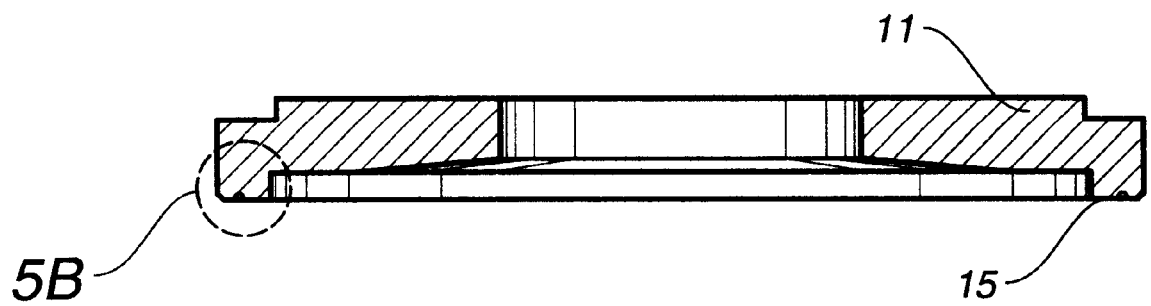
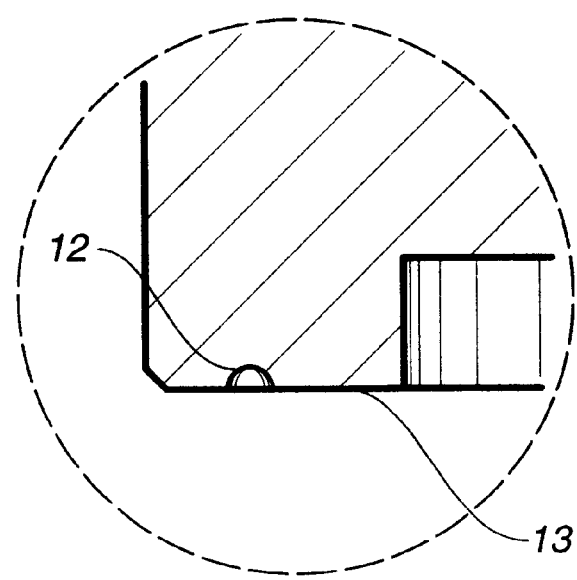
FIG. 5B

SEALING DEVICE FOR DIAPHRAGM VALVES

TECHNICAL FIELD

The purpose of this invention is a sealing device for diaphragm valves designed for high purity fluid circuit control, including a valve body, an elastic diaphragm, a diaphragm seat inserted into a housing made for that purpose in the valve body and a diaphragm clamping cover. The various components of the device ensures that the sealing has optimized material, elasticity and geometry characteristics to guarantee at the same time tightness from the outside environment, proper operation of the valve and resistance to corrosive agents.

BACKGROUND ART

In the current state of the art, the fluid control valve technology comprises on one hand so-called bellows valves, and on the other handle diaphragm valves. The bellows valves offer the advantages of outstanding flow coefficient and capability to work in low pressure down to a vacuum of 10-3 or 10-4 Torr. On the other hand, their main disadvantages are the problems of bellows fabrication due to variable mechanical profiles and to a substantial dead volume in the valve increasing significantly the valve draining time. Finally, said bellows valves have problems of gas contamination through particles coming from the bellows.

Diaphragm valves have a body in which fluid inlet and discharge pipes are provided, with the inlet pipe running into a face opposite which a diaphragm is mounted, which, through deformation, is capable of isolating or connecting up the fluid inlet and discharge pipes by sealing or not sealing the end of the fluid inlet pipe which makes up a seat for the diaphragm.

The major advantage of diaphragm valves is their simple fabrication compared to bellows valves since they can be produced through drawing, bending or cutting. In addition, they have a highly reduced dead volume and a better surface condition thus leading to a significantly lower contamination of the gas.

Offsetting those advantages, they have the problems of limited flow in the open position due to the diaphragm deflection and the possible penetration of moisture into the fluid lines and possible reaction to gasses such as HCl causing corrosion and chemical attack of the fluid lines. Finally, the questions of diaphragm/seat contact tightness in closed position crop up for this type of valve.

Various improvements were made on diaphragm valves, especially by choosing more precise round seats (Patent Application FR 91.07191) or defining diaphragm geometries designed to increase the valve flow in open position (Patent Application FR 91.07192).

Patent FR 0 530 947 describes a diaphragm valve in which the diaphragm has the shape of a spherical dome or cup.

The diaphragm is mounted in a chamber between a bearing of the latter and a ring which through deformation seals the circumferential edge of the dome making up the diaphragm.

The spherical dome shape of the diaphragm puts significant deformation strains on the diaphragm when switching from a position against the seat to a position away from the seat, which may cause rapid deterioration of the diaphragm.

U.S. Pat. No. 4,953,826 describes a diaphragm valve of the above-described type in which the deformable diaphragm is a planar disk which is deformed by an actuating head either curved or as a spherical portion.

The circumferential edge of the diaphragm is blocked between a chamber bearing and a sleeve.

This conformation of the diaphragm and of the actuating head can lead to a deformation of the diaphragm through punctures and deterioration.

The purpose of the invention is to propose a diaphragm valve which avoids such disadvantages.

Another purpose of the invention is to correct the problem of diaphragm valve automatic closing when a vacuum is created in the fluid line. As a matter of fact, in the most frequent case of planar diaphragm valves, just like in patent U.S. Pat. No. 4,953,826, when a vacuum is created in the fluid line, the diaphragm tends to get naturally deformed under the suction effect and to close by pressing against the seat.

The invention also aims at improving the tightness of the valve in relation to the outside environment.

SUMMARY OF THE INVENTION

For that purpose, this invention concerns a fluid circuit sealing diaphragm for gaseous or wet fluid control valves. The valve comprises a valve body with a valve base in which fluid inlet and discharge pipes are provided, a diaphragm in the shape of a cup controlled by a piston which through deformation comes to rest onto the rim of the inlet pipe provided with a seat and is characterized in that the diaphragm cup has a rim which forms an angle with the bottom of the domed cup.

Under another characteristic of the invention, the diaphragm has a slightly raised circumferential rim defined by a circular upward fold which defines an annular portion delimited by a circular fold surrounding the upper part in the shape of a revolution parabolic or spherical dome and that the valve seat onto which the dome rests has a planar annular surface and two slanting and converging walls.

This arrangement enables the diaphragm to maintain its idle position Normally Open (NO) or Normally Closed (NC) through the mere effect of the return force created by its elasticity, contrary to the diaphragms on well-known diaphragm valves, which basically have a planar shape and tend to naturally close under the effect of suction when a vacuum is created in the gas line.

Under a specific arrangement, the bending radius of the domed cup is equal to approximately 20 times the cup radius.

This arrangement results from experience and gives good results both with regard to elasticity and to the effort required to go from the open position to the closed position.

Under a more specific arrangement, the diaphragm for a ¼ inch valve is characterized in that the diaphragm thickness ranges from 0.08 to 0.16 mm, that its diameter is approximately 20 mm and the dome bending radius approximately 200 mm, that the angle made by the rim with the cup bottom ranges from 25 to 40 degrees and in that the depth of the cup is approximately 0.85 mm from the spherical dome bottom to the cup rim.

This precise geometric data for the diaphragm also make it possible to achieve very good operating results for the diaphragm valve.

Even more specifically, the diaphragm is made of a metal alloy with chemical resistance properties equivalent to those of austenitic stainless steel referred to as 316L according to ASTM, cobalt-loaded to be given elasticity properties identical to that of spring steel.

Another reason for selecting this type of material is to achieve good elasticity for the diaphragm.

Advantageously, the diaphragm is made in a metal alloy also containing iron, a percentage from 35 to 45% of cobalt, 18 to 22% of chromium, 13 to 17% of nickel, 5 to 9% of molybdenum, 1 to 3% of manganese, less than 0.25% of carbon and less than 0.2% of beryllium.

This arrangement makes it possible to create diaphragms with both good elasticity and resistance to corrosive agents.

The diaphragm valve body (3) provided with a fluid inlet pipe (4) co-axial to the sealing diaphragm (6), the clamping cover (9) and the clamping piston (7). The body has a half-tore shoulder onto which the diaphragm cover (9) comes to rest to achieve tightness with respect to the valve outside environment.

This arrangement used in combination with diaphragms under the invention guarantees good tightness of the diaphragm valve with respect to the outside environment, thus reducing gas exchanges which might contaminate both the outside environment and the fluid carried in the gas pipeline.

The diaphragm valve body (3) provided with a fluid inlet pipe (4) co-axial to the sealing diaphragm (6) and the clamping piston (7) coming to press against the diaphragm to cause the valve to close. The body has a ring-shaped insert which forms a seat.

The valve performances with respect to closing quality are improved if using a valve body provided with an insert in conjunction with diaphragms of the shape and material in accordance with the invention.

Under a special embodiment of the clamping cover (9) for diaphragm valves, said cover has a groove (12) concentric in relation to diaphragm (6) and clamping cover (9) on its lateral planar surface designed to rest on the lateral circular rim of the diaphragm (6) to ensure tightness with respect to the outside environment.

This embodiment also contributes to an improved tightness of the diaphragm valve once assembled.

The description below, given for information and in no way limiting, highlights the characteristics and advantages of the invention.

BRIEF DESCRIPTION OF THE DRAWINGS

FIG. 5 shows the clamping cover of the diaphragm valve.

DETAILED DESCRIPTION OF THE INVENTION

Figure 1:
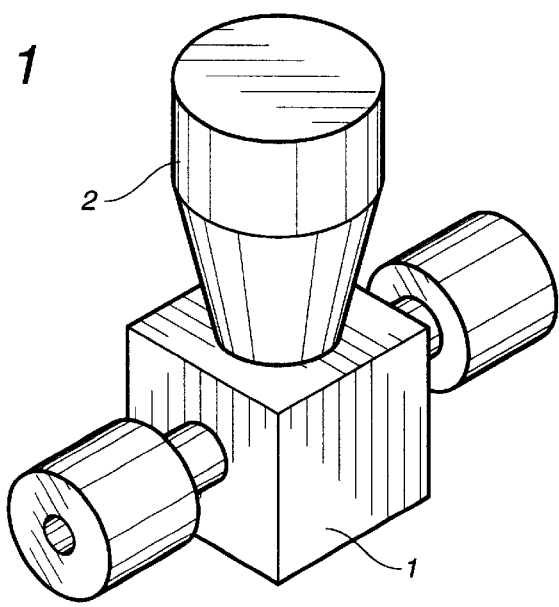
FIG. 1 shows a valve with its various major components.

As shown on FIG. 1 according to a conventional arrangement, the valve under the invention has a valve body 1 which makes up the lower part of the valve and on which actuator 2, of the manual or mechanical type, is mounted.

Figure 2:
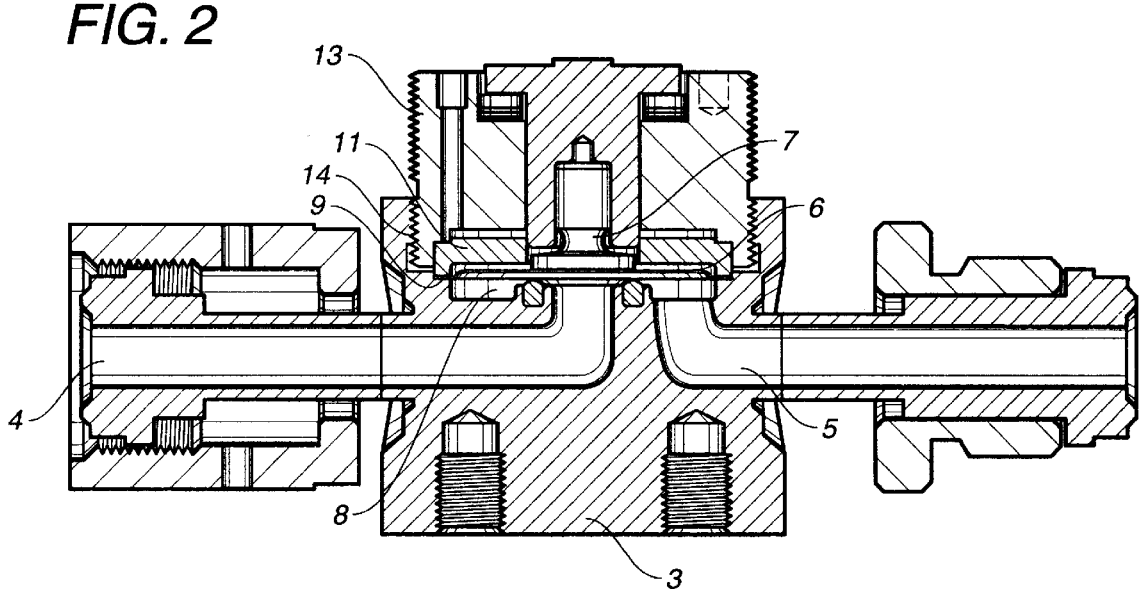
FIG. 2 shows a vertical sectional view of the assembled valve body.

In further details, as apparent on the sectional view (FIG. 2), the valve body 1 has a valve base 3 in which the fluid inlet 4 and discharge 5 pipes are provided, with diaphragm 6 forming a valve closing device whenever the piston deforms the diaphragm to press it hermetically against the rim of the gas inlet pipe.

The fluid inlet 4 and outlet 5 pipes run into a chamber 8 on the valve base. The chamber 8 is circular and has on its circumference a plane annular shoulder 9 on which the outside circumferential rim 10 of diaphragm 6 rests.

Advantageously, the fluid inlet pipe 4 is axial and central in relation to the valve.

The valve body is of a well-known type and its embodiment is known to the ordinary person skilled in the art. Therefore, it will not be further described herein.

Diaphragm 6 is clamped on its outside rim 10 between, on one hand, the valve body 3 at the annular shoulder 9, and, on the other hand, a clamping cover 11 which may be provided with a circular groove in the shape of a half-tore 12 and a central bore to run the actuator piston 7 through. The clamping cover is locked by a clamping sleeve 13 through a thread. The clamping sleeve is in turn mounted on the valve body through thread 14. This implementation guarantees outstanding tightness of the diaphragm assembly.

The cover 11 is shown on FIG. 5 in a sectional view. It has a central bore and a circumferential lower rim 15 forming a ring which comes to rest onto the outside rim 10 of the diaphragm and is centered on the annular shoulder 9.

The diaphragm 6 is made from approx. 0.12 mm thick metal alloy strips, cut and press drawn to the desired shape.

Figure 3:
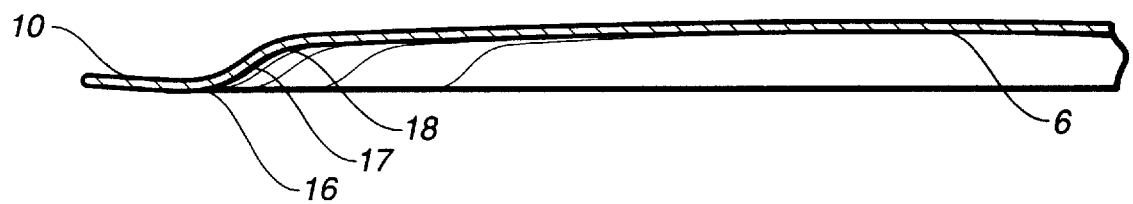
FIG. 3 shows a partial sectional view of the diaphragm under the invention.

The diaphragm shown in a partial view on FIG. 3 has a circumferential rim 10.

Preferably, as shown, this rim is slightly raised on its circumference. The rim is defined inside by a circular upward fold 16 which defines an annular upward portion 17 defined by an upper circular fold 18 surrounding the upper part of diaphragm 6 which is in the shape of a cup forming a revolution parabolic or spherical dome.

This arrangement of the diaphragm makes it possible to prestress the diaphragm by having its slightly raised rim 10 rest onto shoulder 9 under the pressure of cover 11.

The annular folds 16 and 17 stiffen the circumference of the diaphragm and only its central portion is subject to deformation by piston 7 which is controlled by actuator 2.

This stepped configuration of parts 10, 16, 17, 18 of the diaphragm gives it high rigidity and prevents its deformation whenever a vacuum is created in a fluid circuit equipped with valves under the invention.

The diaphragm thickness ranges from 0.08 to 0.16 mm. Its diameter is approximately 21 mm. The dome bending radius is approximately 200 millimeter, and the angle made by the rim 10 with the cup bottom ranges from 25 to 40 degrees The depth of the cup is approximately 0.85 mm measured from the spherical dome bottom to the rim 10.

The dome bending radius is approximately equal to 20 times the cup radius.

Even more specifically, the diaphragm is made of a metal alloy with chemical resistance properties equivalent to those of austenitic stainless steel referred to as 316L according to ASTM, cobalt-loaded to be given elasticity properties identical to that of spring steel. A reason for selecting this type of material is to achieve good elasticity for the diaphragm.

Advantageously, the diaphragm is made of a metal alloy containing in addition to iron, a percentage from 35 to 45% of cobalt, 18 to 22% of chromium, 13 to 17% of nickel, 5 to 9% of molybdenum, 1 to 3% of manganese, less than 0.25% of carbon and less than 0.2% of beryllium.

This arrangement makes it possible to create diaphragms with both good elasticity and resistance to corrosive agents.

Figure 4:
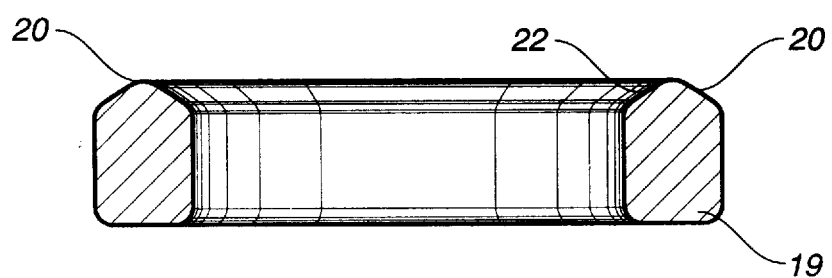
FIG. 4 shows an insert forming a modified seat suitable for use with the diaphragm under the invention.

The valve body has a tapered groove designed to accommodate a seat 18 locked in place as shown on FIG. 4, onto which diaphragm 6 comes to rest in closed position. Seat 19 is preferably made of synthetic resin of the PCTFE (poly-chloro-tri-fluoro-ethylene) type, or a metal alloy, e.g., 316L steel and nickel, or all nickel.

Seat 19 has the shape of a ring on which the sides are slanting and tapering and on which the upper part has a planar annular surface 20 of small size, e.g., 0.2 millimeter, onto which rest the diaphragm and two slanting walls 21, 22 converging toward the planar annular top surface 19.

The seat is mounted on the valve body through force insertion into the housing provided therefor in the valve base. To that effect, the choice of an angle of 1.25 degrees plus or minus 30' in relation to the axis perpendicular to the valve body for both lateral faces of the seat and of the groove acting as housing allows for forced assembly without any gluing or any other part and ensures also the tightness of the assembly.

A PCTFE seat can be removed from its support using hot air causing a differential expansion of the seat and valve base.

The scope of this invention is not limited to the embodiments presented, but on the contrary extends to improvements and modifications accessible to the ordinary person skilled in the art.

We claim:

1. A fluid circuit sealing apparatus comprising:

a valve body having a valve base having a fluid inlet pipe and a fluid discharge pipe extending therethrough;

a diaphragm of a cup shape, said diaphragm being clamped on an edge thereof between said valve body and a clamping cover, said diaphragm having a raised circumferential rim which forms an angle with a bottom of said diaphragm, said diaphragm having a parabolic dome, said raised circumferential rim having a circular upward fold portion extending to a slanting annular portion, said slanting annular portion connected to said parabolic dome by a circular fold, said circular fold extending around a periphery of said parabolic dome; and a piston engageable with said diaphragm so as to deform said diaphragm so as to rest upon a seat provided on a rim of said inlet pipe.

2. The apparatus of claim 1, said seat having a planar annular surface, said seat having a first slanting and converging wall formed on one side of said planar annular surface, said seat having a second slanting and converging wall formed on an opposite side of said planar annular surface.

3. The apparatus of claim 1, said circular upward fold portion extending at an angle of between 25 and 40 degrees from said bottom of said diaphragm.

4. The apparatus of claim 1, said parabolic dome having a bending radius approximately twenty times a physical radius of said diaphragm.

5. The apparatus of claim 1, said diaphragm having a thickness of between 0.08 to 0.16 millimeters inclusive, said diaphragm having a diameter of approximately 20 millimeters, said parabolic dome having a bending radius of approximately 200 millimeters, said raised circumferential rim forming an angle of between 25 and 40 degrees inclusive with a bottom of said diaphragm, said diaphragm having a depth of approximately 0.85 millimeters as measured from a bottom of said parabolic dome to a bottom of said circumferential rim.

6. The apparatus of claim 1, said diaphragm being formed of a metal alloy material having chemical resistant equivalent to austenitic stainless steel cobalt loaded so as to have an elasticity identical to spring steel.

7. The apparatus of claim 1, said diaphragm being formed of a metal alloy material containing iron, cobalt of 35 to 45 weight percent, chromium of 18 to 22 weight percent, nickel of 13 to 17 weight percent, molybdenum of 5 to 9 weight percent, manganese of 1 to 3 weight percent, carbon of less than 0.25 weight percent, and beryllium of less than 0.2 weight percent.

8. The apparatus of claim 1, wherein said seat is a ring having lateral faces forming an angle of 1.25 degrees plus or minus 30 minutes in relation to an axis perpendicular to said valve body, said seat being force mounted in a groove formed in said base of said valve body.

9. The apparatus of claim 8, said seat being formed of a material selected from the group consisting of C316L steel, a steel and nickel alloy, and nickel.

10. The apparatus of claim 8, said clamping cover having a groove formed therein concentric to said diaphragm, said clamping cover having a lateral planar surface resting on said circumferential rim of said diaphragm.

* * * * *